(12) United States Patent
Lee et al.

(10) Patent No.: US 8,283,080 B2
(45) Date of Patent: Oct. 9, 2012

(54) FUEL CELL SYSTEM INCLUDING FUEL SUPPLY APPARATUS

(75) Inventors: Dong-Hun Lee, Suwon-si (KR); Kyu-Nam Han, Suwon-si (KR); Ho-Jin Kweon, Suwon-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 2578 days.

(21) Appl. No.: 11/046,131

(22) Filed: Jan. 27, 2005

(65) Prior Publication Data

US 2005/0164066 A1 Jul. 28, 2005

(30) Foreign Application Priority Data

Jan. 28, 2004 (KR) .................. 10-2004-0005390

(51) Int. Cl.
*H01M 8/06* (2006.01)

(52) U.S. Cl. .......... 429/413; 429/408; 429/443; 62/50.2

(58) Field of Classification Search .................. 429/41, 429/20, 21, 19, 22, 408, 413, 443; 62/50.2
See application file for complete search history.

(56) References Cited

U.S. PATENT DOCUMENTS

| | | | | |
|---|---|---|---|---|
| 7,374,591 | B2 * | 5/2008 | Sommer et al. | 48/198.7 |
| 2001/0045364 | A1 * | 11/2001 | Hockaday et al. | 205/338 |
| 2001/0055709 | A1 * | 12/2001 | Sang | 429/34 |
| 2003/0134167 | A1 * | 7/2003 | Hirakata | 429/22 |

FOREIGN PATENT DOCUMENTS

| | | | |
|---|---|---|---|
| JP | 63-056675 A | | 3/1988 |
| JP | 2001064658 A | * | 3/2001 |
| JP | 2003-048701 A | | 2/2003 |
| JP | 2003-132931 A | | 5/2003 |
| JP | 2003-166701 | | 6/2003 |
| WO | WO 2004007356 A2 | * | 1/2004 |

OTHER PUBLICATIONS

Patent Abstracts of Japan for Publication No. 2003-166071, Date of publication of application Jun. 13, 2003, in the name of Tetsuya Hirata et al.

* cited by examiner

*Primary Examiner* — Raymond Alejandro
*Assistant Examiner* — Zachary Best
(74) *Attorney, Agent, or Firm* — Christie, Parker & Hale, LLP

(57) ABSTRACT

A fuel cell system includes at least one electricity generating unit for generating electric energy through an electrochemical reaction between oxygen and hydrogen, a reformer for reforming fuel to generate hydrogen gas to be supplied to the electricity generating unit, a fuel supply apparatus for absorbing a liquid fuel stored in a fuel reservoir and supplying the fuel to the reformer and an oxygen supply source for supplying oxygen to the electricity generating unit. The fuel supply apparatus employs an absorber with capillary channels in which osmotic pressure is produced due to a concentration differential caused by thermal energy. The osmotic pressure allows the fuel to flow.

11 Claims, 5 Drawing Sheets

FUEL CELL SYSTEM INCLUDING FUEL SUPPLY APPARATUS

CROSS-REFERENCE TO RELATED APPLICATION

This application claims the benefit of and priority to Korean Patent Application No. 10-2004-0005390 filed on Jan. 28, 2004 in the Korean Intellectual Property Office, the entire disclosure of which is incorporated herein by reference.

FIELD OF THE INVENTION

The present invention relates to a fuel cell system, and more particularly, to a fuel supply apparatus for supplying fuel to a reformer.

BACKGROUND OF THE INVENTION

As known in the art, a fuel cell is a system for producing electric power through a chemical reaction between oxygen and hydrogen. In some fuel cell systems, the hydrogen can be provided as a liquid or gaseous hydrocarbon material such as methanol, ethanol, or natural gas.

Recently, a polymer electrolyte membrane fuel cell (hereinafter, referred to as PEMFC) has been developed in the field of fuel cells. Since the PEMFC has excellent output characteristics, a low operating temperature, and fast starting and response capabilities, it has a wide range of applications such as a mobile power source for vehicles, a distributed power source for the home or buildings, and a small-sized power source for use in electronic devices.

The PEMFC system typically includes a stack, a reformer, a fuel tank, and a fuel pump. The stack is an electricity generating assembly consisting of a plurality of unit cells. The fuel pump supplies fuel from the fuel tank to the reformer. The reformer reforms the fuel to create hydrogen gas, and supplies the hydrogen gas to the stack. Accordingly, in a PEMFC system, the fuel in the fuel tank is transferred by the fuel pump to the reformer where the fuel is reformed to generate hydrogen gas. Then, the hydrogen gas is supplied to the stack along with air supplied by a separate pump or compressor. Subsequently, the hydrogen gas and oxygen in the air are electro-chemically reacted in the stack to generate electric energy.

A portion of the power produced by the stack is consumed to drive the entire system. This portion of power consumed in driving the system is referred to as "parasitic power."

Since a conventional fuel cell system includes a separate fuel pump for supplying fuel to the reformer, the entire system capability and its energy efficiency decreases as the parasitic power for driving the separate fuel pump increases. In addition, since a conventional fuel cell system must be provided with a space for the separate fuel pump, it is difficult to design such a system to be of a compact size.

SUMMARY OF THE INVENTION

One embodiment of the present invention provides a fuel supply apparatus capable of supplying fuel to a reformer in a simple structure. In another embodiment of the invention, a fuel cell system is provided employing such a fuel supply apparatus.

According to one embodiment of the present invention, a fuel supply apparatus for a fuel cell system is provided. The fuel supply apparatus comprises a fuel reservoir in which fuel may be stored, and a flow unit connected to the fuel reservoir to absorb the fuel from the fuel reservoir and produce the fuel to a reformer.

The fuel reservoir includes a discharge port for discharging the fuel. The flow unit is connected to the discharge port.

The flow unit includes an absorber formed of a porous material to absorb the fuel by a capillary action. For example, the absorber may comprise a capillary channel having at least one porous inlet and at least one outlet communicating with the inlet.

In the absorber, osmotic pressure is produced in the capillary channel due to a concentration differential caused by thermal energy. The osmotic pressure allows the fuel to flow.

A sealing member may be provided on an entire surface of the absorber excluding the inlet and the outlet to help leakage of fuel.

In one embodiment of the invention, the capillary channel includes a first section having a pathway gradually reduced in cross-sectional area from the inlet toward the outlet, and a second section communicating with the first section and having a pathway gradually enlarged in its cross-sectional area toward the outlet.

At least one groove may be positioned on a side of the absorber to form the outlet.

In one embodiment, the flow unit comprises a heater in contact with the absorber to provide the absorber with thermal energy for evaporating the fuel. By evaporating the fuel, a concentration differential is realized and osmotic pressure draws the fuel through the flow unit.

In one embodiment, the heater comprises a heating plate installed to contact the surface of the absorber corresponding to the second section. A heating coil integrated into the heating plate generates the thermal energy.

According to another embodiment of the present invention, a fuel cell system is provided comprising at least one electricity generating unit for generating electric energy through an electrochemical reaction between hydrogen and oxygen, a reformer for reforming fuel to generate hydrogen gas to be supplied to the electricity generating unit, an oxygen supply source for supplying the oxygen to the electricity generating unit; and a fuel supply apparatus as described above for supplying fuel to the reformer.

A plurality of electricity generating units may be provided to form a stack of electricity generating units as is well known in the art. In such an embodiment, the reformer and the stack are connected to each other by a hydrogen gas supply path, and the hydrogen gas supply path is provided with a valve.

The reformer may comprise a reformation reactor unit for generating hydrogen gas from the fuel. Examples of such catalytic reactors are well known in the art. The reformer may also include one or more carbon monoxide reduction units for reducing the amount of carbon monoxide contained in the reformed gas from the reformation reactor unit.

In one embodiment, the fuel supply apparatus comprises a fuel reservoir forming a sealed space, and a flow unit connected to the fuel reservoir to absorb the fuel and produce fuel to the reformer.

The flow unit may comprise an absorber formed of a porous material to absorb the fuel. Such an absorber comprises at least one capillary channel having at least one porous inlet and at least one outlet communicating with the inlet.

The absorber generates osmotic pressure in the capillary channel by a concentration differential caused by thermal energy. Such osmotic pressure causes the fuel to flow through the capillary channel.

The flow unit may comprise a heater in contact with the absorber to provide the thermal energy for evaporating the fuel and generating the osmotic pressure.

In addition, the oxygen supply source may include an air compressor for supplying air to the electricity generating unit.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION

Exemplary embodiments of the present invention will now be described in detail with reference to the accompanying drawings so that those skilled in the art can implement them without difficulty. However, the present invention can be embodied in various ways different from the exemplary embodiments described herein, and is not intended to be limited by the embodiments described.

Figure 1:
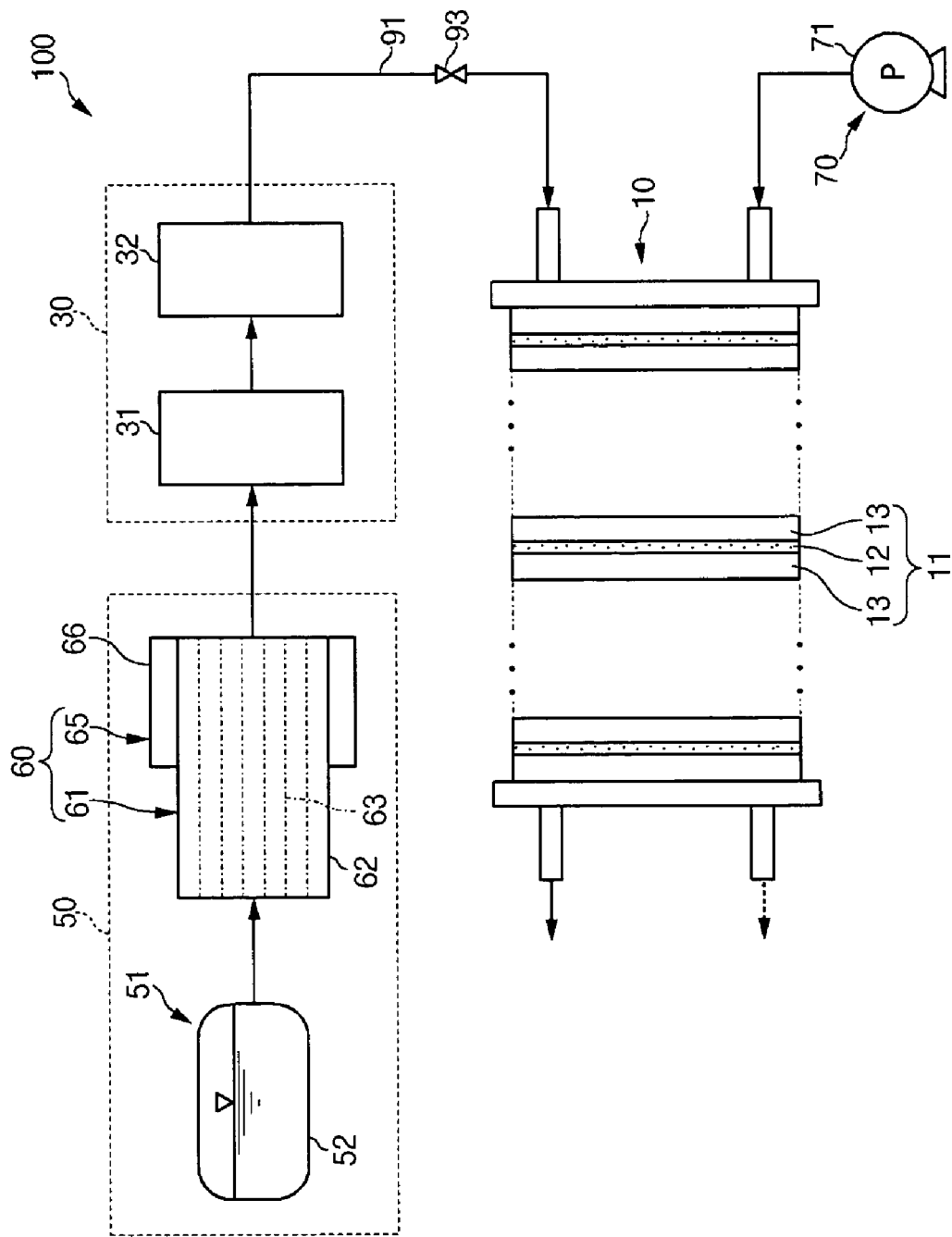
FIG. 1 is a block diagram illustrating a fuel cell system according to one embodiment of the present invention.
Figure 2:
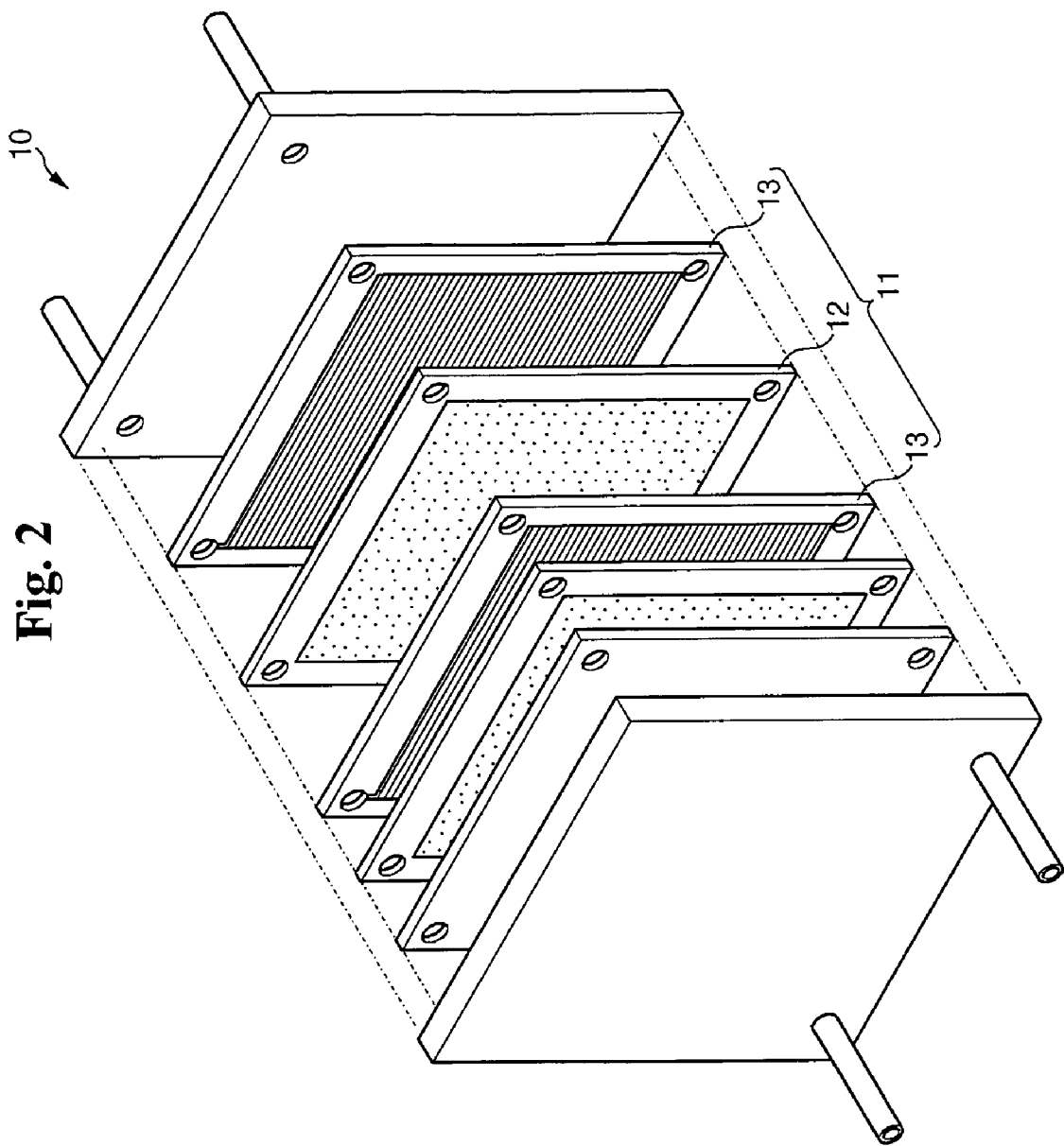
FIG. 2 is an exploded perspective view illustrating the stack of FIG. 1.

FIG. 1 is a block diagram illustrating a fuel cell system according to one embodiment of the present invention and FIG. 2 is an exploded perspective view illustrating the stack of FIG. 1.

A fuel cell system 100 according to one embodiment of the present invention employs a polymer electrode membrane fuel cell (PEMFC). Hydrogen gas is generated by reforming a fuel containing hydrogen. The hydrogen gas is electrochemically reacted with an oxidation gas to generate electrical energy.

In such a fuel cell system 100, the fuel containing hydrogen is taken to include any liquid fuel containing hydrogen such as methanol, ethanol, or a gaseous fuel containing hydrogen such a natural gas. However, for this embodiment, the fuel described is a mixed fuel containing a liquid fuel and water.

According to the invention, the oxidation gas for the system 100 may be oxygen gas, air stored in a separate storage container or atmospheric air. For the present embodiment, atmospheric air is the source of the oxidation gas used for reacting with the hydrogen gas.

The fuel cell system 100 according to the present invention includes at least one electricity generating unit 11 which generates electric energy through the electrochemical reaction between oxygen and hydrogen; a reformer 30 which reforms the fuel to generate the hydrogen gas to be supplied to the electricity generating unit 11; a fuel supply apparatus 50 which supplies fuel to the reformer 30; and an oxygen supply source 70 which in this embodiment is an air compressor 71 that supplies atmospheric air to the electricity generating unit 11.

The electricity generating unit 11 is connected to the reformer 30 and the oxygen supply source 70, to receive hydrogen gas from the reformer 30 and to receive air from the oxygen supply source 70, and induces an electro-chemical reaction between the hydrogen in the hydrogen gas and the oxygen in the air to generate electric energy, thereby constituting a minimum unit of the fuel cell.

The electricity generating unit 11 may be arranged as a membrane-electrode assembly (MEA) 12 with separators 13 (referred to as bipolar plates in the art) disposed on both sides thereof.

The MEA 12 is configured with an anode electrode on one side and a cathode electrode (not shown in the drawing) on the other side, and an electrode membrane is inserted between the two electrodes. Here, the anode electrode induces an oxidation reaction of the hydrogen gas to convert the hydrogen gas into hydrogen ions (i.e., protons) and electrons. The electrode membrane functions as an ion exchange device for moving the hydrogen ions generated in the anode electrode to the cathode electrode. The cathode electrode induces a reduction reaction between oxygen and the hydrogen ions to generate heat and water.

The separator 13 has a closely layered structure interposing the MEA 12 therebetween, so as to supply the hydrogen gas to the anode electrode of the MEA 12 and supply the air to the cathode electrode of the MEA 12 and also functions as a conductor connecting the anode electrode and the cathode electrode in series.

In the fuel cell system 100 according to this embodiment of the present invention, a plurality of electricity generating units 11 as described above, are connected in series, thereby constituting a stack 10.

The reformer 30 in the present system 100 may also be referred to as a fuel processor, and is configured to generate hydrogen gas from the fuel containing hydrogen and supply the hydrogen gas to the electricity generating units 11 of the stack 10. In one embodiment, the reformer further reduces the concentration of carbon monoxide contained in the hydrogen gas. The reformer 30 includes a reformation reactor unit 31 which generates hydrogen gas from the fuel through a catalytic reformation reaction. Such reactions include the reformation of water vapor, partial oxidation, natural reaction, etc. The reformer may also include at least one carbon monoxide reduction unit 32 which reduces the concentration of carbon monoxide contained in the hydrogen gas using methods such as a hydrogenous gas conversion, a catalytic reaction such as the selective oxidation method, or purification of hydrogen using a separator film. Since the reformer 30 described above may be configured as a typical PEMFC-type reformer, its detailed description need not be given.

The reformer 30 and the stack 10 according to the present invention are connected to each other by a hydrogen gas supply line 91. The hydrogen gas supply line 91 is provided with a valve 93 to selectively open and close the supply line 91. The valve 93 may be a constant pressure valve as is well known in the art, which selectively opens or closes the valve body with reference to the hydrogen gas pressure at the reformer 30. In other words, the valve 93 opens the hydrogen gas supply line 91 when the hydrogen gas pressure in reformer 30 rises to a predetermined pressure level, and closes the hydrogen gas supply line 91 when the hydrogen gas pressure remains lower than the predetermined pressure level.

A fuel supply apparatus 50 for supplying fuel to the reformer 30 is configured to absorb liquid fuel stored in a predetermined sealed space and produce the fuel to the reformer 30.

An embodiment of a fuel supply apparatus 50 of the fuel cell system 100 described above will be described in detail with reference to the accompanying drawings.

Figure 3:
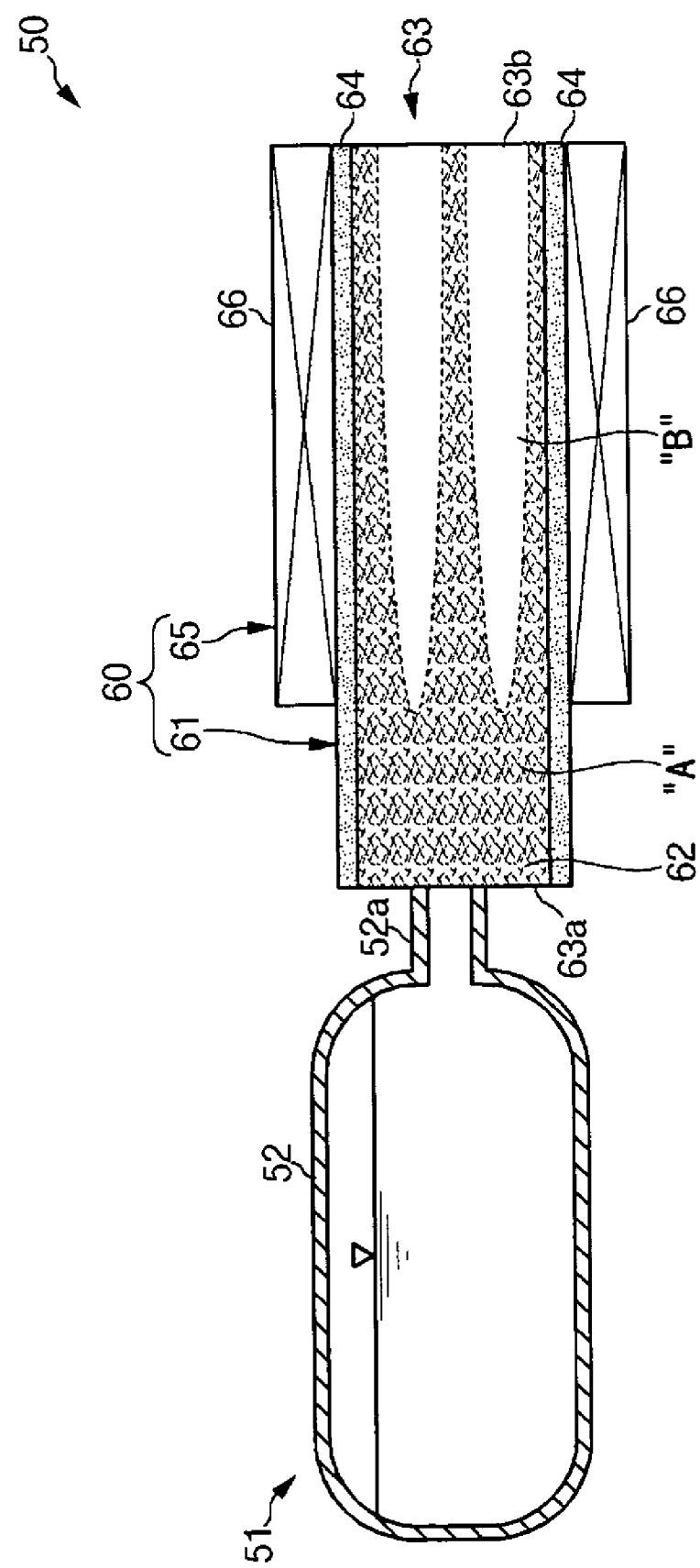
FIG. 3 is a schematic cross-sectional view illustrating the fuel supply apparatus of FIG. 1.

FIG. 3 is a schematic cross-sectional view illustrating the structure of the fuel supply apparatus shown in FIG. 1.

Referring to FIG. 3, the fuel supply apparatus 50 according to the present invention is configured to absorb and evaporate liquid fuel and supply the evaporated fuel to the reformer 30.

For this purpose, the fuel supply apparatus 50 includes a fuel reservoir 51 for storing the liquid fuel and a flow unit 60 for absorbing and evaporating the fuel stored in the fuel reservoir 51 and for producing the evaporated fuel to the reformer 30.

The fuel reservoir 51 forms a sealed space defined by a wall 52, and has a predetermined size to store an appropriate amount of fuel, and includes a discharge port 52a through which the fuel is discharged.

The flow unit 60 absorbs the fuel by capillary action and osmotic pressure and receives thermal energy to evaporate the fuel. The evaporated fuel is then supplied to the reformer 30.

Figure 4:
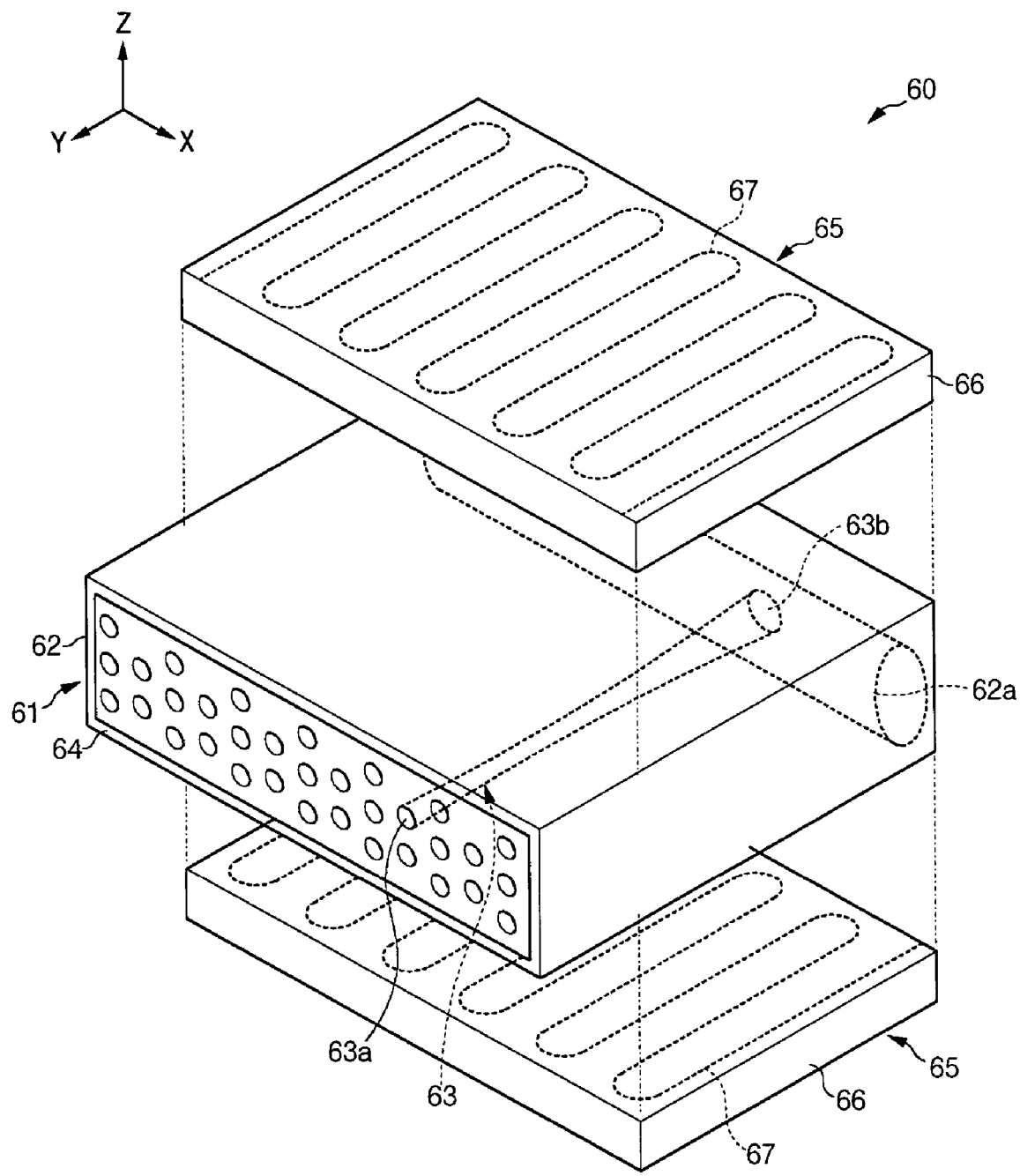
FIG. 4 is an exploded perspective view illustrating the flow unit of FIG. 3.
Figure 5:
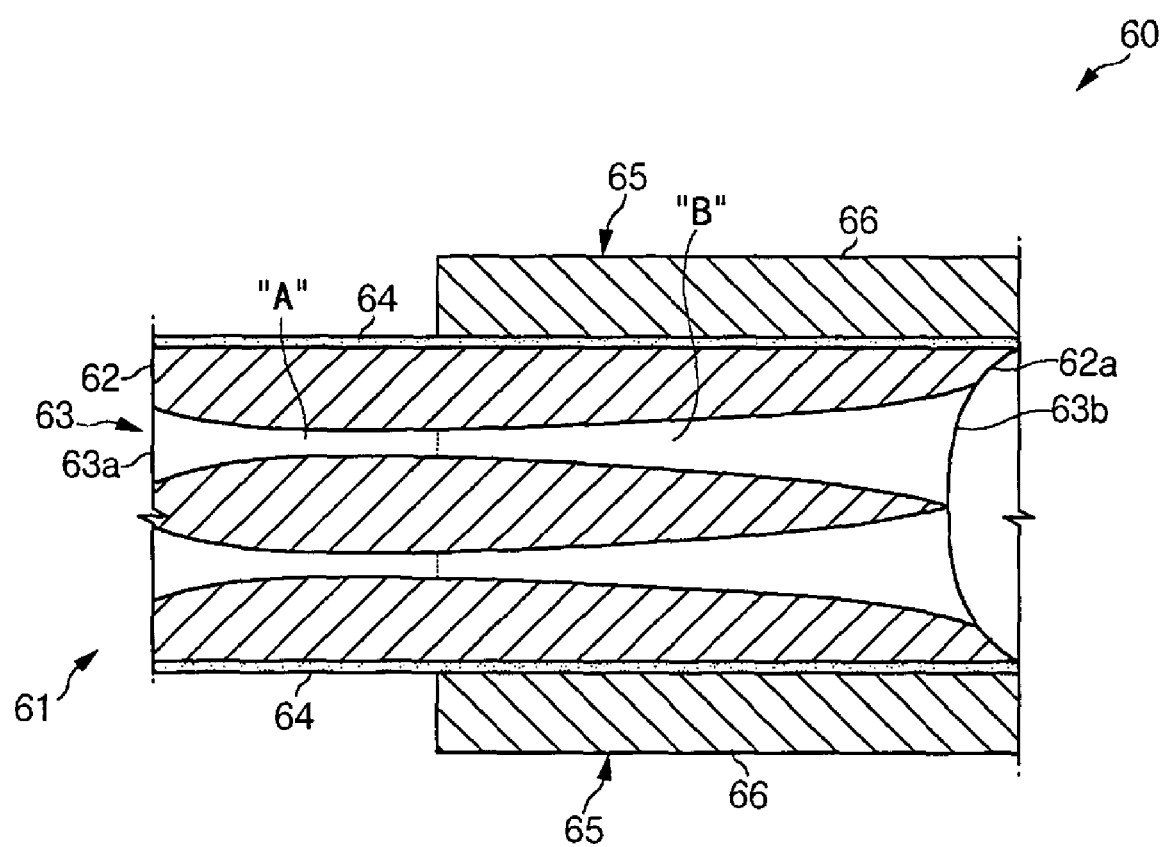
FIG. 5 is a cross-sectional view illustrating the assembled flow unit of FIG. 4.

FIG. 4 is an exploded perspective view illustrating the flow unit of FIG. 3 and FIG. 5 is a cross-sectional view illustrating the assembled flow unit of FIG. 4.

Referring to FIGS. 4 and 5, the flow unit 60 according to the present invention includes an absorber 61 connected to the discharge port 52a of the fuel reservoir 51 and a heater 65 in contact with the absorber 61.

The absorber 61 may be formed of a porous medium such as ceramic, limestone, active carbon, or foamed sponge. The absorber is capable of absorbing liquid fuel stored in the fuel reservoir 51 by a capillary action and osmotic pressure. Preferably, the absorber 61 according to the present invention may be formed of a sintering alloy material having a porous body 62 of high thermal conductivity. In this case, the porous body 62 may have a rectangular plate shape having predetermined length, width, and thickness.

The absorber 61 includes one or more capillary channels 63 formed in the porous body 62, each capillary channel having a porous inlet 63a and an outlet 63b communicating with the inlet 63a by the capillary channel. The capillary channel 63 acts as a flow pathway for producing the fuel stored in the fuel reservoir 51 by capillary action and osmotic pressure as described above, and is formed inside the porous body 62 along the longitudinal direction (i.e., the Y-axis in the drawing).

More specifically, the capillary channel 63 is provided with a porous inlet 63a formed on the fuel reservoir-side of the porous body 62 and an outlet 63b formed on the reformer-side communicating with the inlet 63a. The porous inlet 63a is connected to the discharge port 52a of the fuel reservoir 51, and the outlet 63b is connected to the reformer 30, respectively. The outlet 63b is preferably positioned inside the rounded groove 62a formed on the lateral face of the porous body 62.

Each capillary channel 63 consists of a first section A which is tapered (i.e., gradually reduced in its diameter) from the inlet 63a toward the outlet 63b and a second section B which communicates with the first section A and is reverse-tapered (i.e., gradually enlarged in its diameter) toward the outlet 63b. In one embodiment, the pathway corresponding to the first section A has a maximum diameter of 100 µm and the pathway corresponding to the second section B has a maximum diameter of about 1 mm or more.

As shown in FIG. 3, the capillary channel 63 may be formed in such a structure that the pathways of the first section A are irregularly arranged on the porous body 62 to communicate with other pathways of the second section B, respectively. As shown in FIG. 5, the pathways of the first section A and the second section B may also be regularly arranged with respect to the porous body 62 of the absorber 61.

According to this embodiment, the first section A defines an area for absorbing the fuel stored in the fuel reservoir 51 by osmotic pressure. The second section B defines an area for receiving heat from the heater 65 and evaporating the fuel to generate a concentration differential between the liquid fuel residing in the first section A and the evaporated fuel. Therefore, since the second section B has a reverse-tapered structure compared to the first section A, the evaporated fuel can be readily discharged through the outlet 63b due to the osmotic action and thermal expansion. In addition, in the capillary channel 63, the liquid fuel residing in the first section A can readily flow to the second section B due to the osmotic pressure in the second section B.

Since the absorber 61 is formed of a porous medium, it has a unique capability of absorbing a liquid material. Therefore, the absorber 61 is provided with a sealing member 64 for preventing the fuel absorbed in the porous body 62 from leaking from the surface of the porous body 62. In one embodiment, the sealing member 64 is a metallic thin film formed of a thermal conductive material such as aluminum, copper, or iron, and covers the entire surface of the porous body 62 except for the inlets 63a and the outlets 63b.

As described above, the heater 65 according to the present invention provides the porous body 62 of the absorber 61 with thermal energy to evaporate the fuel flowing from the first section A to the second section B in the capillary channel 63.

The heater 65 includes a heating plate 66 positioned to contact the porous body 62 of the absorber 61 corresponding to the second section of the capillary channel 63. A heating coil 67 is integral to the heating plate 66.

Preferably, the heating plate 66 is positioned to contact the sealing member 64 at the upper and lower sides of the porous body 62 corresponding to the second section B of the capillary channel 63. The heating coil 67 may include a typical electric heating coil which receives electrical power (not shown in the drawing) and generates thermal energy within a predetermined temperature range by an electric resistance.

Now, the operation of the fuel cell system according to an embodiment of the present invention will be described in detail.

First, the discharge port 52a of the fuel reservoir 51 is opened to discharge the liquid fuel stored in the fuel reservoir 51. In this case, the fuel is discharged through the discharge port 52a under atmospheric pressure without any external pumping force.

Subsequently, the liquid fuel is absorbed from the porous inlet 63a of the capillary channel to the first section A of the absorber 61 by the osmotic pressure of the capillary channel 63 while making contact with the porous body 62 of the absorber 61.

Then, the fuel flows from the first section A to the second section B through the reverse-tapered section of the capillary channel 63 toward the outlet 63b.

During this process, heat is applied to the heating coil 67 of the heater 65 by applying electrical resistance to generate thermal energy within a predetermined temperature range. The thermal energy is delivered to the heating plate 66 to heat the second section B of the capillary channel 63 inside the porous body 62.

Accordingly, the liquid fuel inflowing to the second section B of the capillary channel 63 is evaporated by the thermal energy provided from the heating plate 66. Subsequently, osmotic pressure is generated in the second section B due to the concentration difference between the liquid fuel residing in the first section A and the evaporated fuel in the second section B. Since the contacting area in the second section B is gradually enlarged from the first section A, the fuel can be readily evaporated. This will reduce thermal energy losses in the heater 65, thereby improving energy efficiency of the entire system 100.

Accordingly, the evaporated fuel is readily discharged through the outlets 63b of the capillary channel 63 due to the osmotic pressure in the second section B, and an increased pressure caused by the thermal expansion.

At the same time, the liquid fuel residing in the first section A flows into the second section B due to the osmotic pressure in the second section B. Then, the fuel stored in the fuel reservoir 51 is continuously supplied to the first section A through the inlets 63a in the same volume as the fuel discharged through the outlets 63b due to the capillary action and the osmotic pressure. In this case, the flow rate of the fuel supplied to the first section A can be controlled by the thermal energy of the heating coil 67. That is, when the thermal energy generated from the heating coil 67 increases, the osmotic pressure increases, so that the flow of the fuel supplied to the first section A also increases. On the contrary, when the thermal energy generated from the heating coil 67 decreases, the osmotic pressure decreases, so that the flow of the fuel supplied to the first section A also decreases.

Then, the evaporated fuel discharged from the outlets 63b of the capillary channel 63 is supplied to the reformation reactor unit 31 of the reformer 30. The reformation reactor unit 31 generates hydrogen gas from the fuel through a reformation catalyst reaction such as by a steam reforming (SR) catalytic reaction. In such an embodiment, since the reformation reactor unit 31 has difficulty in fully accomplishing the reformation catalytic reaction, hydrogen gas is generated with an amount of carbon monoxide as a byproduct.

Subsequently, the hydrogen gas is produced to the carbon monoxide reduction unit 32. There, the concentration of carbon monoxide is reduced through a catalytic reaction such as the water-gas shift reaction (WGS) or a preferential CO oxidation (PROX) reaction. The hydrogen gas with reduced carbon monoxide levels is then produced to the stack 10 through the hydrogen gas supply line 91. At this point, valve 93 may be opened and closed to control the flow of the hydrogen gas supplied to the stack 10 through the hydrogen gas supply line 91 depending on a predetermined electric output of the stack 10.

During this process, the air compressor 71 starts to operate to supply air to the stack 10. Subsequently, the electricity generating unit 11 generates a predetermined amount of electric energy output through an electro-chemical reaction between hydrogen and the oxygen contained in the air.

Accordingly, the fuel cell system 100 according to the present invention can supply a predetermined amount of electric energy output through a stack to a predetermined load such as a mobile electronic device including a notebook computer or a PDA, or some other mobile communication terminal by repeating a series of processes described above.

As described above, a fuel cell system according to the present invention does not require a fuel pump in comparison with conventional fuel cell systems. Therefore, it is possible to reduce parasitic power consumption for driving the entire system and thus to improve system performance and efficiency. In addition, the entire system can be constructed in a more compact size.

Although embodiments of the present invention have been described in detail hereinabove in connection with certain exemplary embodiments, it should be understood that the invention is not limited to the disclosed exemplary embodiments, but, on the contrary, is intended to cover various modifications and/or equivalent arrangements included within the spirit and scope of the present invention, as defined in the appended claims.

What is claimed is:

1. A fuel cell system comprising:
   at least one electricity generating unit adapted to generate electric energy through an electro-chemical reaction between hydrogen and oxygen;
   a reformer adapted to reform fuel and produce hydrogen to the electricity generating unit;
   a fuel supply apparatus comprising an absorber adapted to absorb a liquid fuel and supply the fuel to the reformer, wherein the absorber comprises at least one capillary channel defining a pathway that is first gradually reduced in cross-sectional area from an inlet, and then gradually enlarged in cross-sectional area toward an outlet; and
   an oxygen supply source adapted to supply the oxygen to the electricity generating unit.

2. The fuel cell system according to claim 1, wherein a plurality of electricity generating units are provided to form a stack.

3. The fuel cell system according to claim 2, wherein the reformer and the stack are in communication with each other by a hydrogen gas supply path, and the hydrogen gas supply path includes a valve.

4. The fuel cell system according to claim 1, wherein the reformer comprises:
   at least one reformation reactor unit adapted to generate a hydrogen gas stream from the fuel through a catalytic reaction; and
   at least one carbon monoxide reduction unit adapted to reduce the concentration of carbon monoxide contained in the hydrogen gas stream.

5. The fuel cell system according to claim 1, wherein the fuel supply apparatus further comprises a fuel reservoir.

6. The fuel cell system according to claim 1, wherein the absorber comprises a porous material adapted to absorb the liquid fuel.

7. The fuel cell system of claim 1, further comprising a sealing member provided around the absorber excluding the inlet and the outlet.

8. The fuel cell system according to claim 1, wherein the absorber further comprises a heater adapted to apply thermal energy to the absorber.

9. The fuel cell system according to claim 8, wherein the heater is in contact with the absorber.

10. The fuel cell system of claim 8, wherein the heater comprises:
    a heating plate; and
    a heating coil integrated into the heating plate.

11. The fuel cell system according to claim 1, wherein the oxygen supply source comprises an air compressor.

* * * * *